Aug. 28, 1951 R. A. REICH 2,565,665
SCREW AND METHOD OF MAKING SAME
Filed March 23, 1946
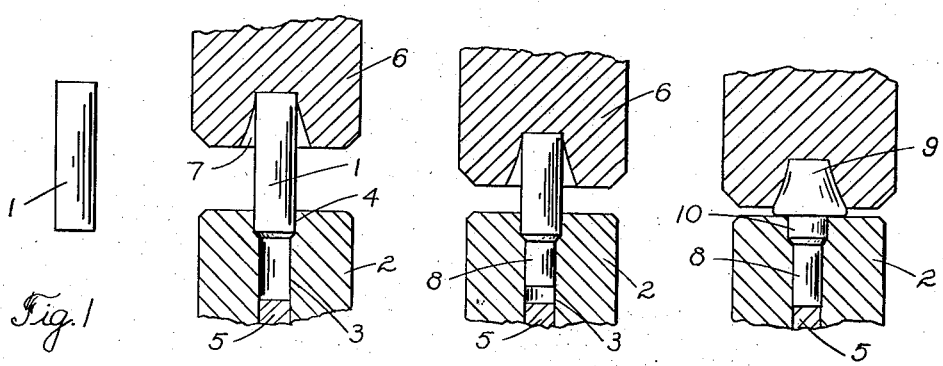
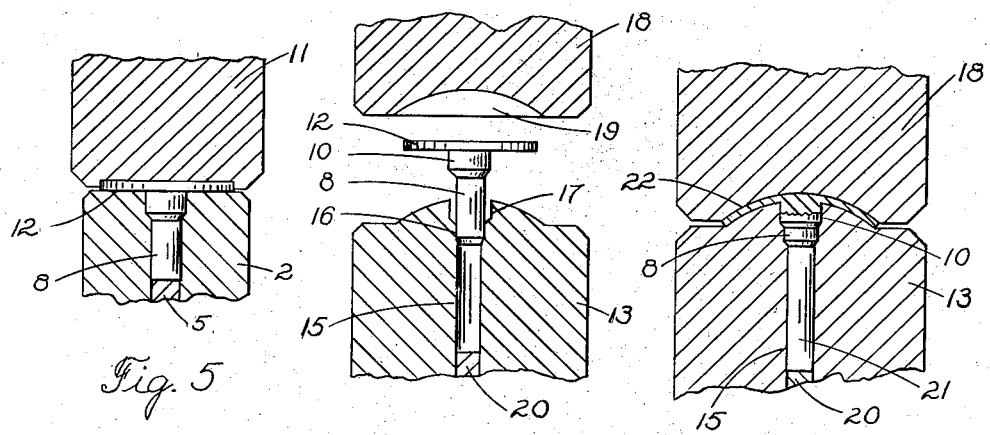
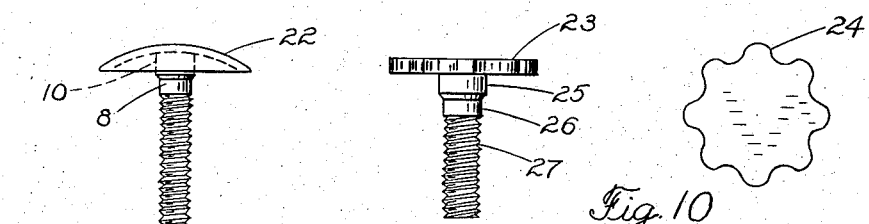
INVENTOR
ROBERT A. REICH
BY
Bosworth & Sessions
ATTORNEYS Patented Aug. 28, 1951

2,565,665

UNITED STATES PATENT OFFICE 2,565,665

SCREW AND METHOD OF MAKING SAME

Robert A. Reich, Berea, Ohio, assignor to The Ohio Nut & Bolt Company, Berea, Ohio, a corporation of Ohio Application March 23, 1946, Serial No. 656,603

3 Claims. (Cl. 10—27)

This invention relates to threaded articles such as screws and the like, and to improvements in making such articles. More particularly, my invention relates to an improved form of screw having a head of large diameter in relation to the diameter of the threaded portion and to improvements in procedures for making this type of screw from blanks of generally circular cross section by cold working operations.

Prior to my invention certain types of leveling screws which are used to vary the length of the legs of furniture to accommodate floor irregularities, and adjusting screws having relatively large and thin heads to facilitate manual turning of the screw, have commonly been made by welding a standard screw to a stamped head or by machining from bar stock. This is a relatively expensive, wasteful, and time-consuming procedure, and it is among the objects of my present invention to provide an improved method of making large headed screws, of the type described, from wire or rod by cold working operations. Other objects of my invention are: the provision of an improved large headed screw which is sufficiently rugged for its intended use and which may be economically manufactured, using a minimum of material; the provisison of an improved cold working process for forming large headed screws or screw blanks from generally cylindrical blanks of rod or wire; and the provision of an improved cold working method for making screws or screw blanks of the type described whereby the resulting product will have a head portion of larger diameter or volume, relative to the diameter of the threaded portion, than had previously been possible under known cold working procedures.

The above and other objects of my invention will appear from the following description of several forms of large headed screws and a preferred series of steps for manufacturing same in accordance with my improved process, reference being had to the accompanying drawings which are illustrative only and not intended to be in exact scale and proportion, and in which:

Figure 1 illustrates the length of rod or wire which forms the initial blank or slug from which the finished article is formed;

Figure 2 is an illustrative fragmentary cross sectional view showing the slug in position in the initial die just prior to beginning the first forming operation;

Figure 3 is a view similar to Figure 2 but showing the blank partially forced into the drawing portion of the die;

Figure 4 illustrates the finish of the upsetting and drawing operation shown in Figures 2 and 3;

Figure 5 shows the blank in the same drawing die as is illustrated in Figures 2, 3 and 4, but with the head further upset and flattened by a second header operation;

Figure 6 is a cross sectional view of the second set of dies with the partially formed blank from Figure 5 in its starting position in the die;

Figure 7 shows the final position of the dies shown in Figure 6 and illustrates a leveling screw blank in the form it takes prior to the threading operation;

Figure 8 is a detached view illustrating one of my improved leveling screws in finished threaded form;

Figure 9 is a view similar to Figure 8 but illustrating a large headed adjusting screw made in accordance with my invention; and Figure 10 is an end view of the screw shown in Figure 9 showing one form of head which is suitable for adjusting screw uses.

In the manufacture of screws, bolts, or the like, from suitable lengths of rod or wire by upsetting and drawing operations, the volume of material that can be upset to form a head on the article is governed by the relation between the diameter and the length of the material to be upset. If the length of the section of the blank that is to be upset is too great in proportion to the cross sectional area of the material, the blank will bend instead of upsetting evenly, resulting in a head of irregular shape and undesirable metallurgical structure. In the manufacture of standard screws and bolts the volume of material in the head is such that bending difficulties are not encountered, and this type of product can be manufactured by cold heading, using a blank having a diameter substantially equal to the pitch diameter of the thread of the finished article. However, in making screws with very large heads, such as the leveling and adjusting screws described herein, it is not possible successfully to produce the desired size head by upsetting a blank having a diameter substantially equal to the screw pitch diameter.

I therefore start with a blank or slug 1, such as illustrated in Figure 1, which may be a cut off section of rod or wire of a diameter substantially greater than the major diameter of the finished thread, and of a length sufficient to form the head of the desired relatively large diameter and a screw portion of the desired length. The drawing die 2, shown in Figures 2 to 5 inclusive, is formed with a drawing section 3 and a guiding or entering section 4. The kickout pin 5 serves to limit the drawing operation in the die and also to remove the blank from the die by longitudinal movement in well known manner. In Figure 2 the blank or slug 1 is shown in its initial position in the entering section 4 and the header 6 has just engaged the outer end of the slug. This header has an enlarged upsetting section 7 which forms a preliminary upset on the end of the blank. Figure 3 shows the header 6 in an intermediate position during its stroke, the blank 1 having been forced partially into the drawing section 3 of the die 2 to reduce a portion 8 of the blank 1 from its original diameter to approximately the major diameter of the thread of the finished article.

Figure 4 shows the finish of the first drawing and upsetting operation, the blank now having an upset portion 9, a reduced portion 8 of substantially thread major diameter and an intermediate portion 10 of the original diameter of the slug 1.

While the blank remains in the die 2 it is subjected to a second heading operation by the header 11. The finish of this operation is illustrated in Figure 5 which shows that the header 11 in its operating stroke has further upset and flattened the portion 9 of the blank to form the enlarged, relatively thin head 12. The kickout pin 5 next removes the partially completed blank from the die 2 and it is then transferred to the die 13 shown in Figures 6 and 7. This die has a drawing section 15 of diameter equal substantially to the pitch diameter of the finished thread, an entering or supporting section 16 having a diameter substantially the same as the diameter of the portion 8 of the blank, i. e., substantially the thread major diameter, and an enlarged or relieved section 17 of substantially the diameter of the original blank 1. The header 18 is recessed at 19 and the operating stroke of the header forces a portion of the section 8 of the blank into the drawing section 15 of the die until it engages the kickout pin 20 and also gives the desired final contour to the head.

The die 13 and header 18 are so formed that, at the finish of the header stroke as shown in Figure 7, the blank comprises an elongated stem 21 of thread pitch diameter, a relatively short shank portion 8 of approximately thread major diameter, an intermediate portion 10 of the original diameter of the blank 1, and a large, relatively thin, head 22 of generally cylindrical contour. It will be understood that the diameter of the portion 8 may be somewhat more or less than thread major diameter in certain cases. Therefore, where this portion of the article is referred to herein as being of approximately or substantially the thread major diameter it is intended to cover a range from slightly greater than the thread pitch diameter to slightly less than the original blank diameter.

After the blank is removed from the die 13 the stem 21 is threaded, preferably by a roll threading operation, and the finished leveling screw then appears as illustrated in Figure 8. The head of the screw may be trimmed to the desired peripheral form either during the second heading operation shown in Figure 5 or the second drawing and head forming operation shown in Figures 6 and 7.

In Figures 9 and 10 I have illustrated a modified type of screw which is particularly adapted for use as a hand operated adjusting screw. The elements of this screw include a head 23 having a knurled or serrated edge 24, an intermediate section 25 of diameter greater than the thread major diameter, an unthreaded section 26 of diameter substantially equal to the thread major diameter and a threaded stem 27.

From the above description of a series of cold working operations which carry out my improved process, it will be seen that the blank or slug 1, which is preferably but not necessarily of circular cross section, is subjected to a double upsetting operation at one end and a double drawing operation at the other end, while an intermediate portion 10 of the blank is not subjected to material change in form or volume during the entire process. This intermediate section 10 retains the metallurgical characteristics of the original blank 1. By starting with a blank of diameter sufficiently large to permit the large thin head 22 to be formed therefrom by cold upsetting, and reducing the opposite end of the blank to thread pitch diameter while leaving an intermediate section of original blank diameter and of unchanged metallurgical structure, a strong, large headed screw blank is formed by a simple and economical procedure. The portion 10 of the screw serves to reinforce and form a substantial base for the relatively large thin head 22. The metal of the portion 10 is not subjected to cold working and therefore retains its original characteristics. By my process, screws having heads as much as five or six times the diameter of the threaded portion may be formed from rod or wire without waste of material and much more rapidly and economically than by the previous machining operations employed for making this type of article.

Although I have illustrated and described two particular forms of threaded articles which may be made by my process, and have described and illustrated in considerable detail a series of steps and dies which may be employed to carry out my process, it will be understood that my invention contemplates the production of numerous other types of threaded or unthreaded articles, having heads of large diameter as compared to the diameter of the shank portion. Furthermore variations in the particular steps of my process may be made without departing from the spirit of my invention, and I therefore do not wish to be limited to the particular embodiments herein shown and described but claim as my invention all forms and modifications thereof coming within the scope of the appended claims.

I claim:

1. The method of making screws or the like which includes the steps of drawing down an end portion of a blank having a diameter larger than the major diameter of the thread of the finished screw to a reduced diameter equal substantially to the thread major diameter and in the same operation upsetting a portion only of the opposite end of the blank to form an enlarged portion, further upsetting said enlarged portion to form a head having a diameter equal to at least three times the thread major diameter, a mid-section of the blank between said enlarged and reduced portions retaining its original diameter during said drawing and upsetting operations, further drawing a portion only of said reduced portion of the blank to form a stem of substantially the thread pitch diameter, and forming a thread having said pitch diameter on said stem portion of the blank.

2. A method of making screws or the like from a cylindrical blank of greater diameter than the major diameter of the finished screw thread, which includes the steps of reducing one end portion of the blank by drawing in a die substantially to the major diameter of the screw thread and in the same operation upsetting the opposite end of the blank to form an enlarged portion while retaining a mid-section of the blank in its original form, further upsetting said enlarged portion to form a head while retaining the blank in the die, removing the partially formed blank from the die and further reducing a part of the section of thread major diameter to thread pitch diameter in another die and in the same operation finish forming the head, said mid-section of the blank retaining substantially its original diameter, and rolling a thread having said pitch diameter on the pitch diameter section of the blank.

3. A large head screw or the like, formed by cold working a cylindrical blank, having a head whose greatest transverse dimension is equal to at least three times the thread major diameter, an unthreaded shank portion of substantially the thread major diameter, a threaded portion, an intermediate section next adjacent to said head and between said head and said shank portion, and a chamfered inwardly tapering portion between said intermediate section and said unthreaded shank portion, said unthreaded shank portion and said threaded portion having the metallurgical structure resulting from drawing the material of the blank, said head having the metallurgical structure resulting from upsetting the material of the blank, and said intermediate section being substantially unchanged in diameter and having a substantially unchanged metallurgical structure from said blank.

ROBERT A. REICH.

REFERENCES CITED

The following references are of record in the file of this patent:

UNITED STATES PATENTS

| Number | Name | Date |
|---|---|---|
| 2,006,852 | Wilcox | July 2, 1935 |
| 2,024,070 | Sharp | Dec. 10, 1935 |
| 2,027,980 | Horten | Jan. 14, 1936 |
| 2,064,918 | Kaufman | Dec. 22, 1936 |
| 2,113,172 | Cordes | Apr. 5, 1938 |
| 2,132,244 | Richard | Oct. 4, 1938 |